(12) United States Patent
Mitsubori

(10) Patent No.: US 8,976,412 B2
(45) Date of Patent: Mar. 10, 2015

(54) METHOD AND SYSTEM FOR RECOGNIZING TAB SHEETS AND DISPLAYING ONE OR MORE SETS OF TABS SHEETS ON A GRAPHICAL USER INTERFACE

(71) Applicant: Toshiyuki Mitsubori, San Mateo, CA (US)

(72) Inventor: Toshiyuki Mitsubori, San Mateo, CA (US)

(73) Assignee: Konica Minolta Laboratory, U.S.A., Inc., San Mateo, CA (US)

( * ) Notice: Subject to any disclaimer, the term of this patent is extended or adjusted under 35 U.S.C. 154(b) by 114 days.

(21) Appl. No.: 13/623,511

(22) Filed: Sep. 20, 2012

(65) Prior Publication Data

US 2014/0078524 A1 Mar. 20, 2014

(51) Int. Cl.
*G06K 15/02* (2006.01)
*G06F 3/12* (2006.01)

(52) U.S. Cl.
CPC ............ *G06F 3/1232* (2013.01); *G06F 3/1204* (2013.01); *G06F 3/1253* (2013.01); *G06F 3/1285* (2013.01)
USPC .......................... 358/1.9; 358/1.13; 358/1.18

(58) Field of Classification Search
None
See application file for complete search history.

(56) References Cited

U.S. PATENT DOCUMENTS

| | | | |
|---|---|---|---|
| 2004/0005164 A1* | 1/2004 | Sugimoto | 399/81 |
| 2004/0130088 A1* | 7/2004 | Sato et al. | 271/3.14 |
| 2005/0041993 A1* | 2/2005 | Barry et al. | 399/127 |
| 2008/0266596 A1* | 10/2008 | Sato | 358/1.15 |
| 2009/0153891 A1* | 6/2009 | Sakuraba | 358/1.12 |
| 2011/0150551 A1* | 6/2011 | Oba | 400/582 |

\* cited by examiner

*Primary Examiner* — Kimberly A Williams
(74) *Attorney, Agent, or Firm* — Buchanan Ingersoll & Rooney PC

(57) ABSTRACT

A computer program product comprising a non-transitory computer readable medium having a computer readable code embodied therein for displaying one or more sets of tab sheets on a graphical user interface, the computer readable program code configured to execute a process, which includes inputting attributes of one or more sets of tab sheets into an image forming apparatus. The attributes of the one or more sets of tab sheets are converted into a thumbnail image. Upon selecting tab paper in a paper media menu on a graphical user interface, the thumbnail image of the one or more sets of tab sheets is displayed. A set of tab sheets is then selected for insertion into a print job, and the print job is sent to the image forming apparatus for printing.

18 Claims, 8 Drawing Sheets

METHOD AND SYSTEM FOR RECOGNIZING TAB SHEETS AND DISPLAYING ONE OR MORE SETS OF TABS SHEETS ON A GRAPHICAL USER INTERFACE

FIELD OF THE INVENTION

This invention relates to a method and system for recognizing tab sheets and displaying one or more sets of tab sheets on a graphical user interface, and more particularly, to a method and system for displaying one or more sets of tabs on a printer driver user interface as a thumbnail image of the one or more sets of tabs sheets which are contained within a tray of an image forming apparatus.

BACKGROUND

In recent years, there have been various image forming apparatuses or multifunction peripheral (MFP), which can perform a tab printing function to insert tab sheets into desired positions in a printed document having a plurality of pages and printing letters and such on a tab of the tab sheet. Use of this tab printing function saves user's trouble of inserting tab sheets into specific portions or positions in a printed document or writing, thereby improving user-friendliness in creating a printed document with tab paper.

However, tab sheets do not come in only one size. Rather, tab sheets can have a main sheet having one paper size with tabs having different sizes and shapes, or alternatively, the paper size of the tab sheets can be different. Accordingly, it would be desirable to have a system and method for recognizing tab sheets and displaying one or more sets of tab sheets as a thumbnail image on a graphical user interface of an image forming device and/or a printer driver user interface of client device.

SUMMARY OF THE INVENTION

In consideration of the above issues, it would be desirable to have a system and method, which recognizes tab sheets and displays one or more sets of tab sheets on a graphical user interface, such as printer driver user interface as a thumbnail image.

In accordance with an embodiment, a computer program product comprising a non-transitory computer readable medium having a computer readable code embodied therein for displaying one or more sets of tab sheets on a graphical user interface, the computer readable program code configured to execute a process, which includes the steps of: inputting attributes of one or more sets of tab sheets into an image forming apparatus; converting the attributes of the one or more sets of tab sheets into a thumbnail image; selecting tab paper in a paper media menu on a graphical user interface; displaying the thumbnail image of the one or more sets of tab sheets upon the selection of the tab paper setting; selecting a tray having a set of tab sheets for insertion into a print job; and sending the print job to the image forming apparatus for printing.

In accordance with another embodiment, a method for displaying one or more sets of tab sheets on a graphical user interface, comprises: inputting attributes of one or more sets of tab sheets into an image forming apparatus; converting the attributes of the one or more sets of tab sheets into a thumbnail image; selecting tab paper in a paper media menu on a graphical user interface; displaying the thumbnail image of each of the one or more sets of tab sheets upon selection of the tab paper setting; selecting a tray having a set of tab sheets for insertion into a print job; and sending the print job to the image forming apparatus for printing.

In accordance with a further embodiment, an image forming system comprises: a client device having a printer driver user interface; and an image forming apparatus connected to the client device through a network connection, and wherein the client device and the image forming apparatus perform the following steps: inputting attributes of one or more sets of tab sheets into the image forming apparatus; converting the attributes of the one or more sets of tab sheets into a thumbnail image; selecting tab paper in a paper media menu on the printer driver user interface of the client device; displaying the thumbnail image of each of the one or more sets of tab sheets upon selection of the tab paper setting; and selecting a tray having a set of tab sheets for insertion into a print job; and sending the print job from the client device to the image forming apparatus.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
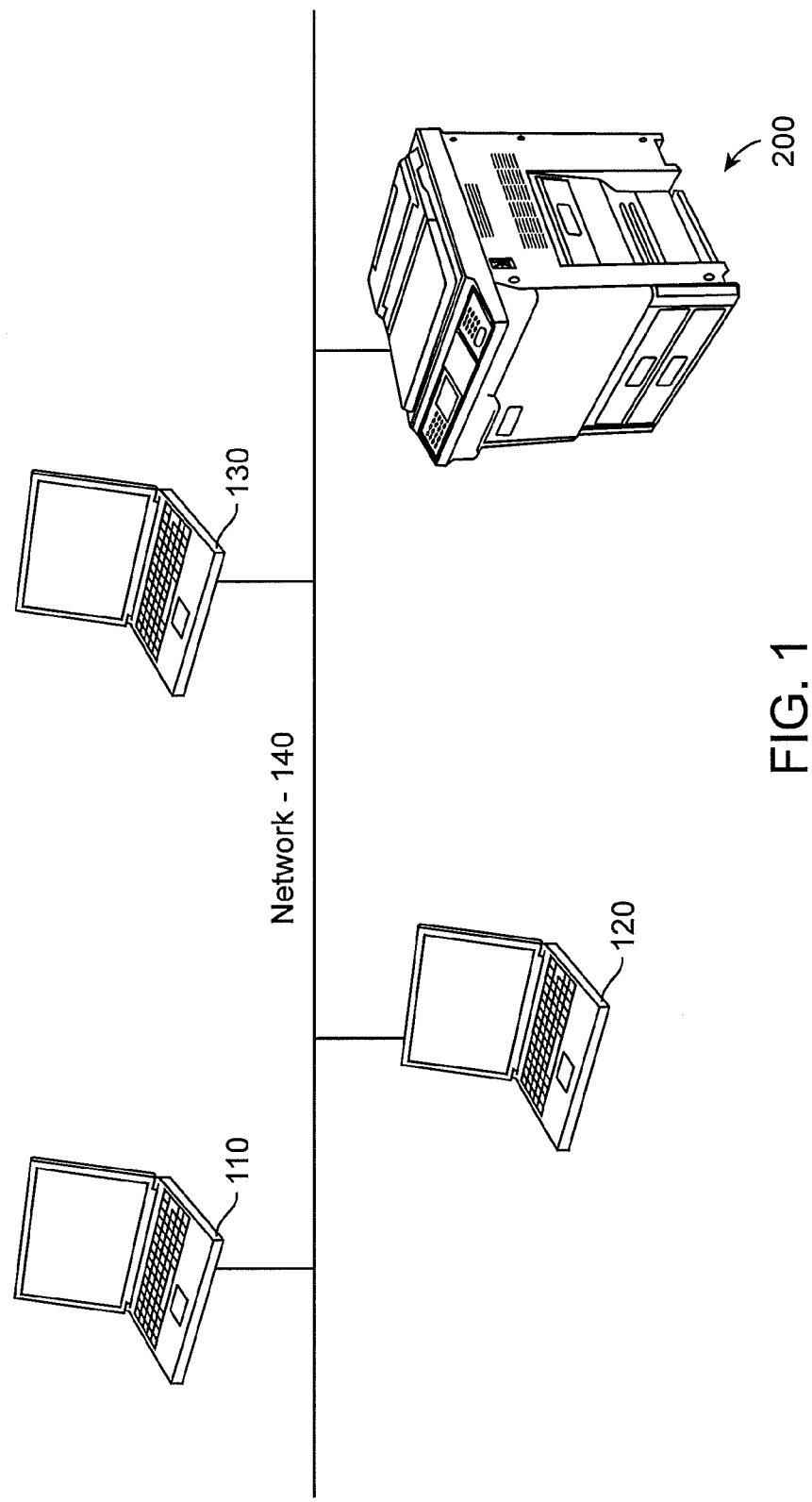
FIG. 1 is an illustration of a system for recognizing one or more sets of tab sheets in accordance with an embodiment.

FIG. 1 is an illustration of an image forming system 100, which includes one or more clients or client devices, 110, 120, 130, and an image forming apparatus 200. As shown in FIG. 1, the one or more clients 110, 120, 130 and the image forming apparatus 200 are connected via an Internet or network connection 140, such as a LAN (Local Area Network) or WAN (Wide Area Network).

In accordance with an exemplary embodiment, each of the one or more client devices 110, 120, 130 include a processor or central processing unit (CPU), one or more memories for storing software programs and data (such as files to be printed). The processor or CPU carries out the instructions of a computer program, which operates and/or controls at least a portion of the functionality of the client devices 110, 120, 130. Each of the client devices 110, 120, 130, also includes an operating system (OS), which manages the computer hardware and provides common services for efficient execution of various software programs. For example, the software programs can include application software and printer driver software. The printer driver software controls the image forming apparatus 200 connected with the client devices 110, 120, 130 in which the printer driver software is installed. In certain embodiments, the printer driver software produces a print job based on an image and/or document data. In addition, the printer driver software can control transmission of the print job from the client device 110, 120, 130 to the image forming apparatus 200.

Each client device 110, 120, 130 can also include a display in the form of a graphical user interface. In accordance with an embodiment, the printer driver software generates a printer driver user interface or graphical user interface in which the user of the client device can provide instructions to the image forming apparatus 200. The client device 110, 120, 130 produces the print job based on the image and/or the document data and sends the print job to the image forming apparatus 200. Users of the client device 110, 120, 130 can produce the image and/or create the print job, which is sent to the image forming apparatus 200 via the network 140. Examples of client devices 110, 120, 130 include and are not limited to personal computers, routers, and/or personal digital assistants (PDAs).

Examples of image forming apparatuses 200 consistent with exemplary embodiments include, but are not limited to, a laser beam printer (LBP), a multifunction peripherals (MFP), a multifunction laser beam printer including copy function, an ink jet printer (IJP), a thermal printer (e.g., a dye sublimation printer) and a silver halide printer. For example, the image forming apparatus can be a color printer or a black and white (B/W) printer.

Examples of the network 140 consistent with embodiments include, but are not limited to, the Internet, an intranet, a local area network (LAN) and a wide area network (WAN). Alternatively, the Internet or network connection 140, which connects the one or more client devices 110, 120, 130 and the image forming apparatus 200 can be a wire (or cable) and/or wireless technology including but not limited to radio frequency (RF) and/or infrared (IR) transmission.

Figure 2:
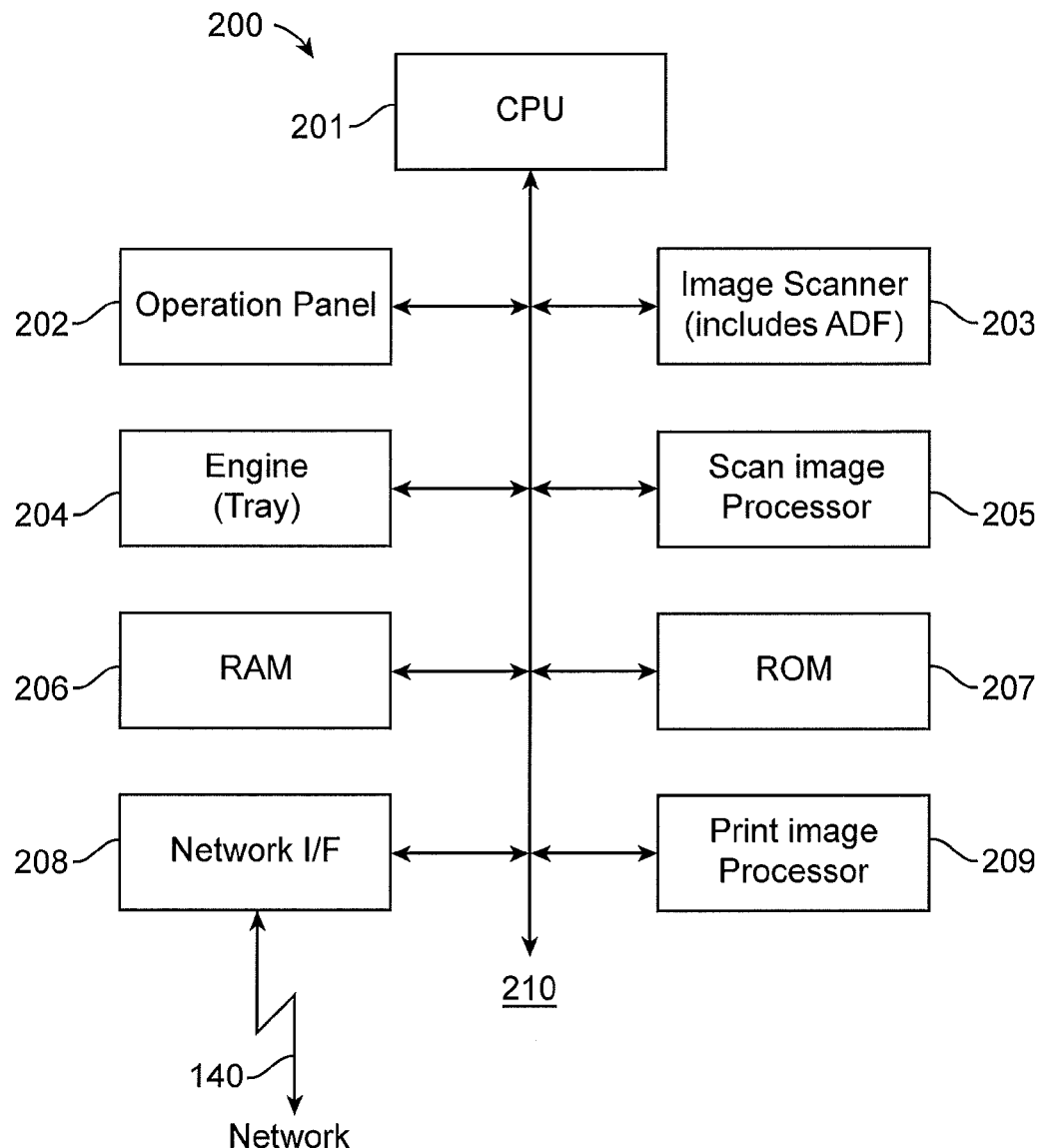
FIG. 2 is an illustration of a block diagram of an image forming apparatus in accordance with an embodiment.

FIG. 2 is a block diagram of portions of an image forming apparatus 200 in accordance with an exemplary embodiment. As shown in FIG. 2, the image forming apparatus 200 includes a CPU (central processing unit) 201, an operation panel or display 202, an image scanner (which can include an automatic document feeder (ADF)) 203, an engine (or tray) section 204, a scan image and processor section 205, RAM (random access memory) 206, ROM (read only memory) 207, a network I/F (interface) section 208, and a print image processor portion 209. In accordance with an embodiment, each part or portion of the image forming apparatus 200 are connected, for example by bus or bus connection 210.

In accordance with an embodiment, the central processing unit 201 is configured to execute a sequence of stored instructions (i.e., a computer program). The image forming apparatus 200 also includes an operating system (OS), which acts as an intermediary between the software programs and hardware components within the image forming apparatus 200. The operating system (OS) manages the computer hardware and provides common services for efficient execution of application software.

In accordance with an embodiment, the central processing unit (CPU) 201, the random access memory (RAM) 206, and the read only memory (ROM) 207 form the printer controller (or controller) of the image forming apparatus 200. The controller processes the data and job information received from the client devices 110, 120, 130 to generate a print image.

The print image processor (or image processing section) 209 carries out image processing under the control of the controller, and sends the processed print image data to the print engine 204. The print engine 204 forms an image on a recording sheet based on the image data sent from the image processing section 209. The controller is programmed to process data and control various other components of the image forming apparatus 200 to carry out the various methods described herein. The image forming apparatus 200 also can include a hard disk drive (HDD) or storage device, which stores digital data and/or software programs for recall by the controller. In accordance with an exemplary embodiment, the digital data can include resources, for example, graphics/images, logos, form overlays, fonts, etc.

The computer system program and various processing program which are memorized by a storage part (not shown) are read, which develops in RAM 206, and CPU 201 carries out concentrated control of the operation of the image forming apparatus 200 each part according to the developed program. In accordance with an embodiment, the CPU 201 performs the tab paper reading processing and print-data development processing as disclosed herein.

The operation panel 202 displays the status display of various manual operation buttons or equipment, the operation situation of each function, etc. on the operation panel or display screen according to the instruction of the status signal input from the CPU 201. In accordance with an embodiment, the operation panel 202 is a LCD (Liquid Crystal Display) panel. In addition, the operation panel or display screen 202 can be covered with a pressure-sensitive-type (resistance film pressure type) touch panel constituted by arranging a transparent electrode in the shape of a lattice, which detects the XY coordinates of the power point pushed with fingers, a touch pen, etc. with a pressure value, and outputs them to the CPU 201 by making the detected position signal into an operation signal. The operation panel 202 is provided with various manual operation buttons, such as number buttons and a start button, and outputs the operation signal to the CPU 201.

For example, if printing in the image forming apparatus 200 is instructed from the operation panel 202, a graphical user interface of print setting screen is displayed on the user interface and tab printing is specified from a print setting screen, the tab printing designation screen mentioned will be displayed. The operation panel 202 outputs operation signals which correspond to the operated key and/or keys to the CPU 201 including the keyboard provided with the various function key, letter keys and/or numerical keypad. The operation panel 202 can also be provided with pointing devices, for example, a mouse and/or a touch panel.

The image forming apparatus 200 can include an image scanner 203, which images documents (e.g. tab sheets) which are read or imaged by the scanner and the results input into the scan image processor 205. The image scanner 203 can include among other components a light source, and CCD (Charge Coupled Device), which images and carries out a photoelectric conversion of the reflected light of the light from the light source to the document, reads the image of the document and/or tab sheet and outputs the read image to the scan image processor 205. The image obtained by the image scanner 203 can contain image data, such as a figure and a photograph, text data, including characters and signs. In the addition, the image scanner 203 can detect color, for example, the color of the tab sheets. In accordance with an embodiment, the image scanner 203 includes an automatic document feeder or ADF, which feeds one or more sheets of a print media to the image scanner 203 for scanning.

The print engine portion 204 can include among other components, a photoconductive drum, a toner, a discharge part, and a feeding part. In accordance with an embodiment, the print engine portion includes one or more trays, which houses print media. The print media can be plain paper, tab sheets and other printable media. The print image is conveyed from the print image processor 209 to the print engine portion 204 of the image forming apparatus for printing and/or placement of tab sheets within a stack of print media. In accordance with an embodiment, an electrostatic latent image of the print image is provided from the print image processor 209 and formed in the photoconductive drum surface. The print engine portion 204 makes a toner adhere to a region including the electrostatic latent image on the surface of a photoconductive drum, and after transferring and fixing a toner to the print media conveyed from a feeding part or tray, which is then discharged to an output tray.

In the various processing in which execution control is carried out by the CPU 201, the RAM 206 becomes a temporary storing region, such as a program read from the storage part, an input or output data, and a parameter. In accordance with an embodiment, RAM 206 has the tab information storage part, which memorizes the attributes of the tab sheets read by the image scanner 203.

The network I/F section 208 provides communications between the print image processor 209 and the client devices 110, 120, 130 and receives page descriptions (or print data) from the client devices 110, 120, 130 for processing within the image forming apparatus 200. In accordance with an exemplary embodiment, the operation of printer section commences when it receives a page description from the client device 110, 120, 130 via the network I/F 208 in the form of a print job data stream. The page description may be any kind of page description languages (PDLs), such as PostScript® (PS), Printer Control Language (PCL), Portable Document Format (PDF), XML Paper Specification (XPS).

The print image processor 209 performs image processing, such as scaling, rotation, and repositioning, gradation processing, frequency processing, to the image data input from the image scanner portion 203, and outputs the image data to the print engine portion 204.

Figure 3:
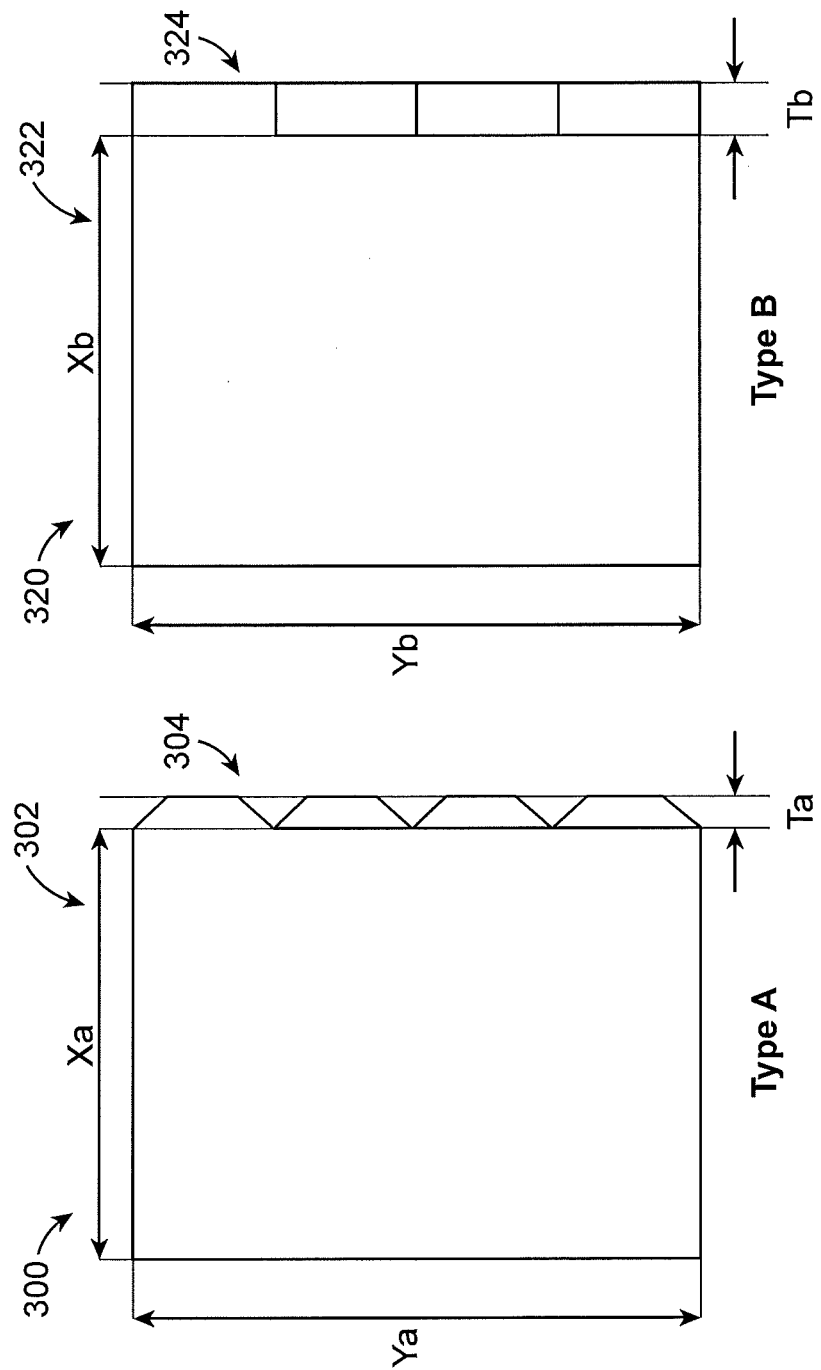
FIG. 3 is an illustration of two sets of tab sheets, wherein the attributes of the two sets of tabs sheets are different.

FIG. 3 is an illustration of two sets of tab sheets 300, 320, wherein the attributes of the two sets of tabs sheets 300, 320 are different. Each set of tab sheets 300, 320 consists of two or more sheets of print media (or main sheet) 302, 322, and wherein each sheet of print media 302, 322 has a tab 304, 324 attached to an outer edge thereof. Each of the tabs 304, 324 extends outward from the sheet of print media and provides a reader of a stack of print media a relatively easy way to separate chapters of a document or book, or alternatively, provide for a means to reference a chart, a drawing, or a beginning of a new section or chapter of the book and/or document.

As shown in FIG. 3, each set of tab sheets 300, 320 has a plurality of paper attributes, which describes each set of tab sheets 300. For example, the attributes of a set of tab sheets 300, 320 can include and is not limited to a size of the print media 302, 322 (e.g., A3, A4, letter (8.5 by 11 inches), legal), a size and shape of each of the tabs 304, 324, a weight of the print media and tabs 302, 304, 322, 324, a color of the print media and/or tabs 302, 322, and/or a finish on the print media and/or tabs 302, 322.

For example, the print media 302 for the tab sheet identified as Type A has height Ya, a width Xa, and a width of tab Ta. The print media 322 for the tab sheet identified as Type B has a height of Yb, a width Xb, and a width of tab Tb. The height Ya, Yb, and width Xa, Xb of the print media 302, 322 for type A and B are the same. However, the width of tab Ta 304 is different than the width of tab Tb 324. In addition, as shown, the set of tab sheets of Type A have a tab having a pair of angle edges, and the set of tab sheets of Type B have a tab having a generally rectangular shape.

For example, the recognition of a set of tab sheets having a print media 302, 322 of size A4 (e.g., approximately 297 mm in height and 210 mm in width) can have one or more different tab sizes, shapes, number of tabs, and color associated therewith. For example, a generally rectangular tab 304 with a pair of edges having an angle of approximately 45 to 90 degrees to the outer edge of the sheet of print media can have a width for example of 12.7 mm or 15 mm. In addition, different set of tab sheets based on the size and shape of the tab can provide a user with different available print area depending on the size and shape of the tab. Accordingly, it would be desirable for the image forming apparatus 200 to recognize the different sizes and shapes of tab sheets 300, 320 and have a method and system of depicting the size and shapes of the set of tab sheets 300, 320 to a graphical user interface on the operation panel 202 of the image forming apparatus 200 and/or the graphical user interface or printer driver user interface of the client device 110, 120, 130.

Figure 4:
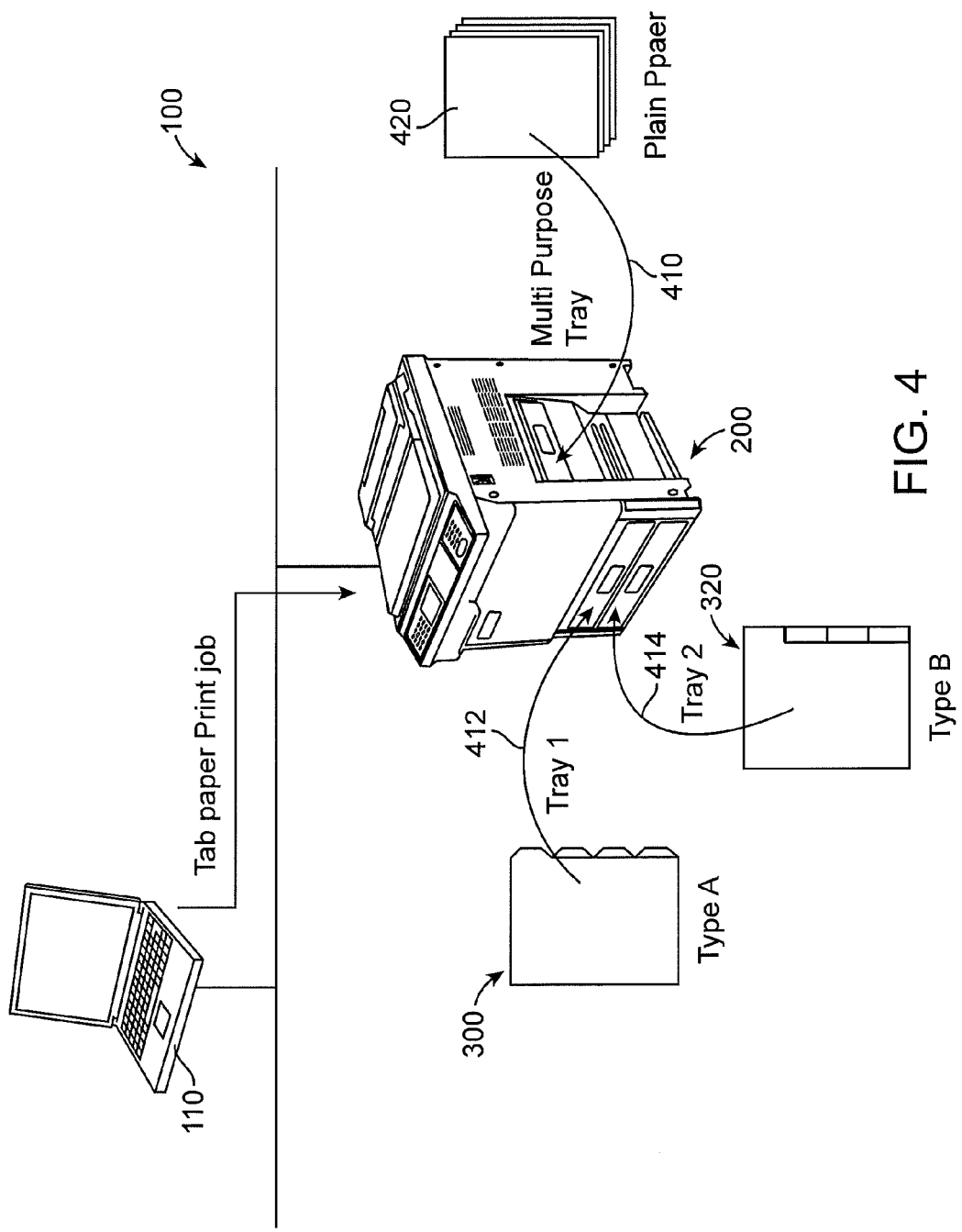
FIG. 4 is an illustration of a system for recognizing and displaying tab sheets on an image forming apparatus in accordance with an embodiment.

FIG. 4 is an illustration of a system 100 for recognizing and displaying tab sheets 300, 320 on an image forming apparatus in accordance with an embodiment. As shown in FIG. 4, the system 100 includes one or more clients or client devices, 110, 120, 130, and an image forming apparatus 200. The one or more clients 110, 120, 130 and the image forming apparatus 200 are connected via an Internet or network connection 140, such as a LAN (Local Area Network) or WAN (Wide Area Network).

The image forming apparatus 200 includes one or more print trays 410, 412, 414, which are configured to receive a stack or plurality of a print media 420, which is fed to the print engine of the image forming apparatus 200. The one or more trays 410, 412, 414 can be configured to receive plain paper (e.g., a print media without tabs) 420 and/or sets of tabs sheets 300, 320. The image forming apparatus 200 preferably includes a multi-purpose tray 410, which houses plain paper or a print media without tabs 420, and one or more trays (for example, Tray 1 and Tray 2), which house print media without tabs and/or a print media with tabs in the form of a set of tab sheets 300, 320. For example, as shown in FIG. 4, Tray 1 and Tray 2 can include a print media having tabs, for example, a set of tab sheets 300, 320 as shown in FIG. 3.

Figure 5:
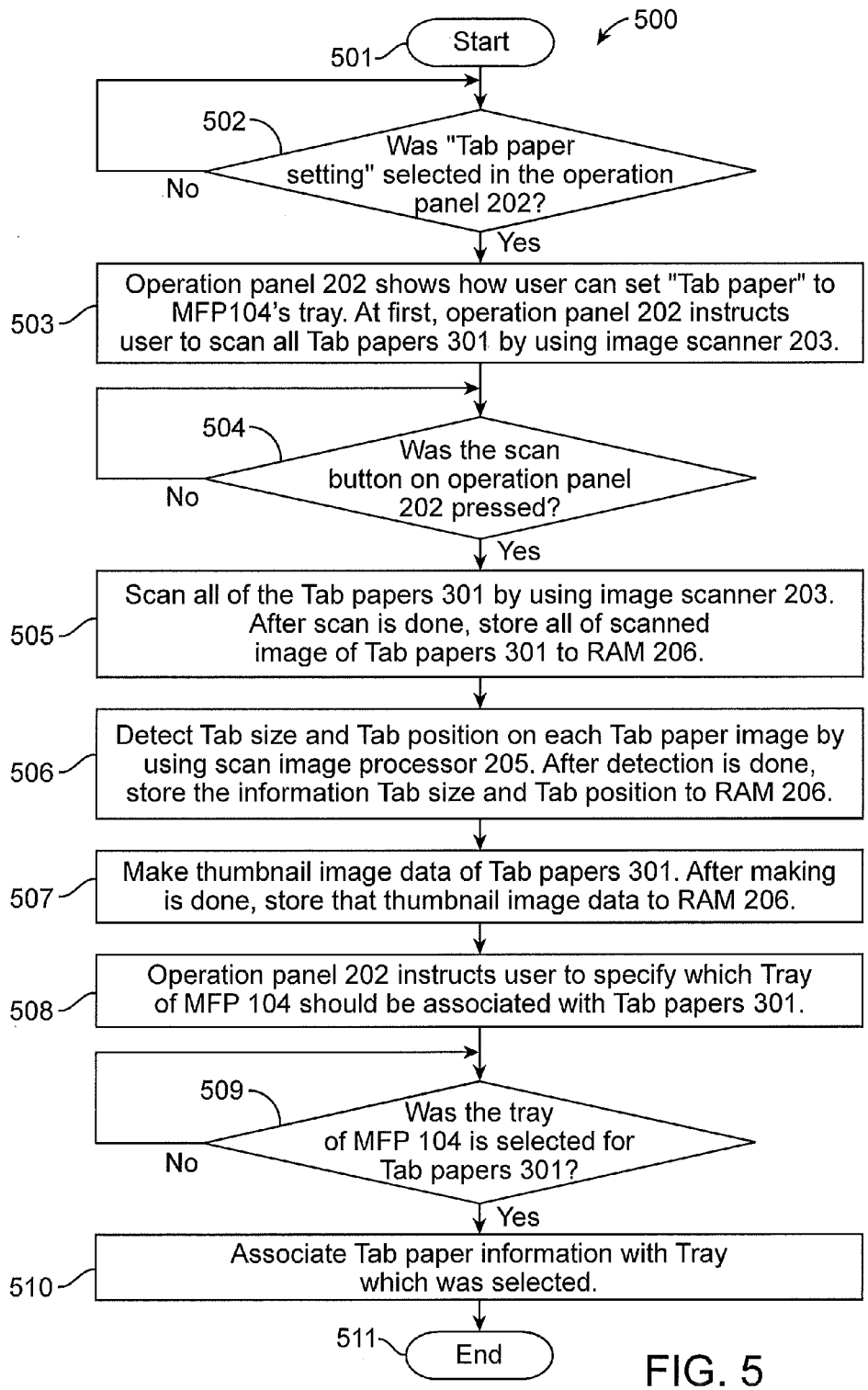
FIG. 5 is an illustration of a flow chart showing the setting of a set of tab sheets on an image forming apparatus from an operation panel.

FIG. 5 is an illustration of a flow chart 500 showing the setting of a set of tab sheets 300, 320 on an image forming apparatus 200 from an operation panel 202. In step 501, the process for setting tab sheet paper to an image forming apparatus (or multifunction peripheral) is started. In step 502, the method determines if the tab paper setting was selected in the operation panel 202. If the tab paper setting was selected, the process proceeds to step 503. If the tab paper setting is not selected, the process returns to step 501 until the process is started on the operation panel 202. In step 503, the operation panel 202 shows how the user can set "tab paper" to a tray within the image forming apparatus 200. At first, the operation panel 202 instructs the user to scan all tab papers or tab sheets 300, 320 by using the image scanner 203. For example, the tab paper or tab sheets 300, 320 can be fed via an automatic document feeder (ADF).

In step 504, the process checks to ascertain if the scan button on the operation panel 202 has been pressed. If the button has been pressed, the process moves to step 505. If the scan button has not been pressed on the operation panel 202, the process returns to step 504. In step 505, all of the tab papers or tab sheets 300, 320 are scanned using the image scanner 203. After the scanning of the tab papers or tab sheets 300, 320 is completed, all of the scanned images are stored to RAM 206.

In step 506, the print media size, the tab size, the tab position, and the color on each of the tab paper or tab sheets from the images obtained in step 505 is detected using the scan image processor 205 and the information is stored to RAM 206. In step 507, thumbnail image data of the tab papers 300, 320 are generated and the information is stored to RAM 206.

In step 508, the operation panel 202 instructs the user to specify which tray of the image forming apparatus 200 should be associated with the scanned tab sheets 300, 320. In step 509, if a tray of the image forming apparatus 200 is selected, the process continues to step 510. If a tray is not selected, the process requests that the user select a tray for the tab sheets 300, 320 as imaged. In an alternative embodiment, the association can be made to the tray that was most recently operated (opened and/or closed) by the user.

In step 510, the associated tab paper information or attributes for the selected tray are recorded within the image forming apparatus and provided upon request to the graphical user interface of the image forming apparatus and/or client device as disclosed herein. The tab paper setting process for the image forming apparatus ends in step 511.

Alternatively, the associated tab paper information or attributes can be manually input into the image forming apparatus 200 using the touch pad and/or keyboard on the operation panel 202. For example, the tab paper information or attributes can be manually input into the image forming apparatus by bar code, serial number and/or other recognized designation system, which identifies the type of tab sheets including size of print media or main sheet, the size and shape of the tab, color of the tab sheets, unit weight of the tab sheets, and any associated finishes on the tab sheets.

Figure 6:
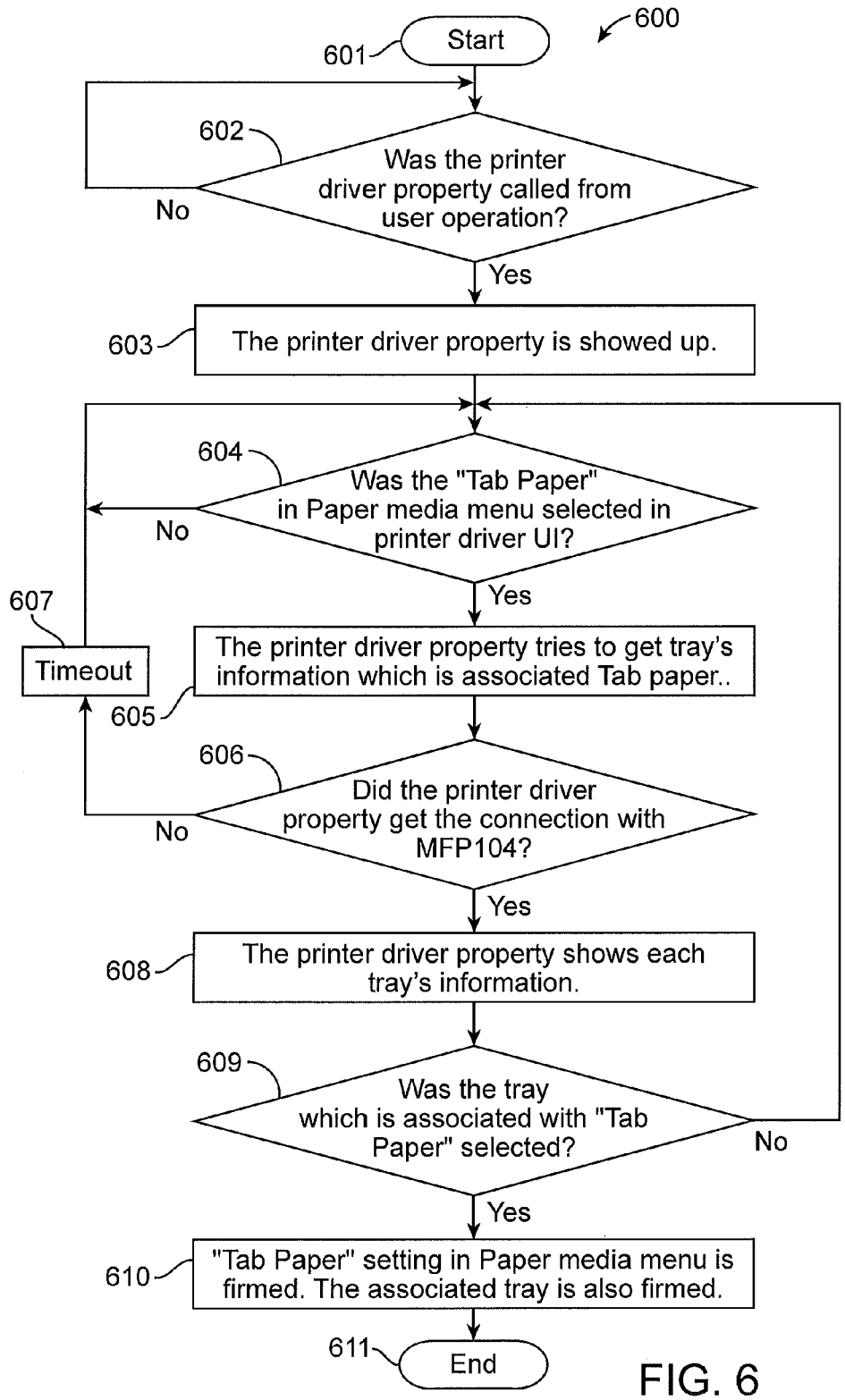
FIG. 6 is an illustration of a flow chart for a print driver of a client device and showing of available tab sheets in an image forming apparatus in accordance with an exemplary embodiment.

FIG. 6 is an illustration of a flow chart 600 for a print driver of a client device 110, 120, 130, which shows available tab sheets in an image forming apparatus 200 in accordance with an exemplary embodiment. As shown in FIG. 6, the process starts with step 601 in which the printer driver of the client device is started. In step 602, if the printer driver property is properly called and/or requested from the user operation, the process continues to step 603. If the printer driver property is not properly caller from the user operation, the process returns to the start position, until the printer driver is properly started.

In step 603, if the printer driver property is depicted on a graphical user interface, (e.g., the printer driver user interface) of the client device 110, 120, 130, the process proceeds to step 604, wherein the tab paper dropdown is selected in the paper media menu of the printer driver user interface. In step 605, the printer driver properly tries to obtain information from the image forming apparatus as to the available tab paper within one or more of the trays within the image forming apparatus. In step 606, if the printer driver properly obtained a connection with the image forming apparatus, and the process proceeds to step 608. If the printer driver does not properly obtain a connection with image forming apparatus, in step 607, the process times out, and the user returns to step 604 and selects the tab paper within the paper media menu.

In step 608, the printer drivers shows or depicts each of the available trays within the image forming apparatus and available print media including tab paper. In step 609, if the tray with tab paper is selected the process continues on to step 610, in which the tab paper setting in the paper media menu is confirmed and the associated paper tray is also confirmed. If the tray which is associated with tab paper is not selected, in step 609, the process returns to the printer driver user interface for the user to select a different option within the paper media window.

In step 611, the process ends upon the selection of the corresponding tray within the image forming apparatus 200 which houses the desired tab sheets 300, 320.

Figure 7:
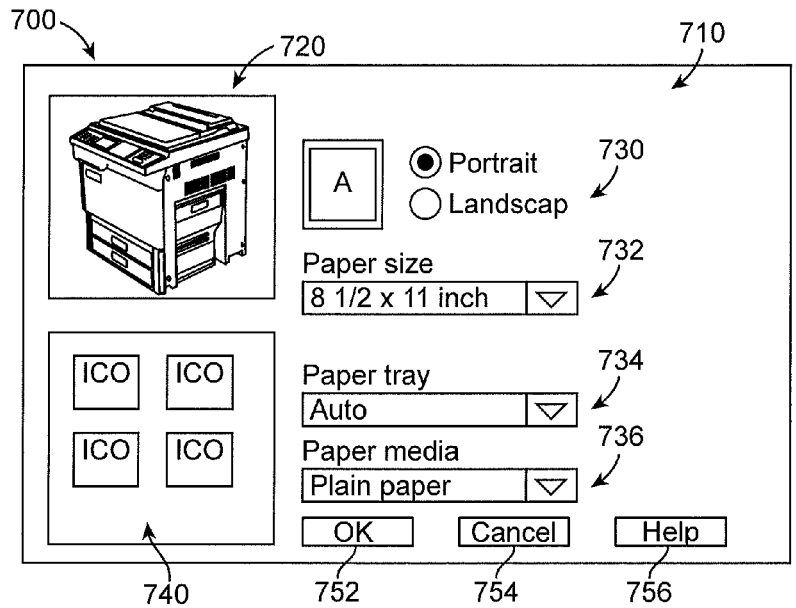
FIG. 7 is an illustration of a printer driver user interface of a client device in accordance with an exemplary embodiment.

FIG. 7 is an illustration of a printer driver user interface 700 of a client device 110, 120, 130 in accordance with an exemplary embodiment. As those skilled in the art appreciate, it is common for a printer driver user interface 700 to have switchable print setting screens for respectively displaying different print job setting items, and FIG. 7 illustrates one of such print setting screens for displaying items related to print media settings. As shown in FIG. 7, the print setting screen includes an external view of the image forming apparatus 720 with which the printer driver is associated, a plurality of icons 740, which depict print job settings designed by the user through the plural print setting screens, such as single/double sided print, stapling, hole punching, watermark and so on, an option of portrait or landscape for the print out 730, a paper size window 732, a paper tray window 734, and a paper media window 736. In addition, the printer driver user interface 700 can include an "OK" button or icon 752, a "Cancel" button or icon 754, and a "Help" button or icon 756.

In accordance with an embodiment, the paper size window 732, the paper tray window 734 and the paper media window 736 are roll-down cursor windows. For example, each of the windows, buttons or icons can be controlled through the use of cursor via a mouse and/or keyboard. In accordance with an alternative embodiment, each of the windows, buttons or icons can be controlled via touch screen technology, which can detect the presence and location of a touch within the display area to change the paper size, change the layout of the image, and to initiate and/or start the printing process.

Figure 8:
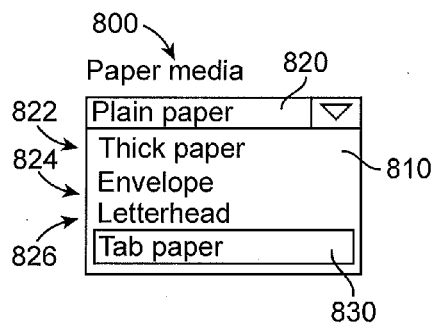
FIG. 8 is an illustration of a paper media roll down cursor window as shown in the printer driver user interface of FIG. 7.

FIG. 8 is an illustration of a paper media roll down cursor window 800 as shown in the printer user interface 700 of FIG. 7. As shown in FIG. 8, the roll down cursor window 800 includes one or more options for the user to select for a paper media 810. For example, the paper media 810 can include plain paper 820, thick paper 822, envelopes 824, letterhead 826 and/or tab paper 830.

Figure 9:
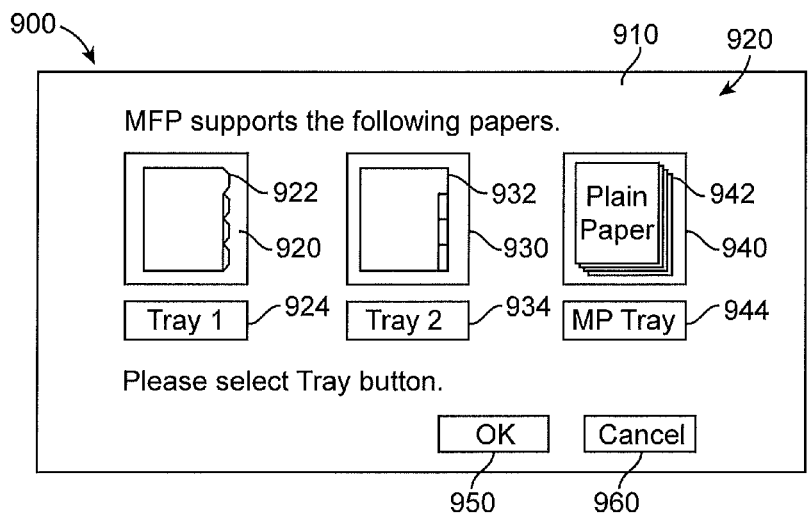
FIG. 9 is an illustration of the printer driver user interface of the client device showing the availability of one or more types of tab sheets.

FIG. 9 is an illustration of tab paper user interface screen 900 showing the availability of one or more types of tab sheets upon selection of the tab paper 830 icon in the paper media window 800. The tab paper user interface screen 900 is a graphical user interface screen 910, which depicts the one or more trays available and the types of print media available. For example, as shown in FIG. 9, Tray 1 920 and Tray 2 930 have tab paper 922, 932, and a multi-purpose (MP) tray 940 includes plain paper 942. Each of the trays 920, 930, 940, includes a selection button or icon 924, 934, 944.

In accordance with an exemplary embodiment, the tab paper user interface screen 900 depicts the available tab sheet by a thumbnail image of the tab sheets, which includes the tab size, the tab position, the tab shape, and print media color(s) for the set of tab sheets. For example, as shown in FIG. 9, Tray 1 has tab paper having a set of 4 tabs, which have a generally rectangular shape with an angled edge, while Tray 2 as shown includes tab paper having a set of 4 tabs, which have a generally rectangular shape without an angled edge; therefore, the user can easily recognize from the thumbnails at least parts of the attributes of each tab sheet set. The tab paper user interface screen also provides the user with one or more icons or buttons to select a tray having tab sheets with an "OK" button or icon 950 and a "Cancel" button or icon 960.

Each of the windows, buttons or icons can be controlled through the use of cursor via a mouse and/or keyboard. In accordance with an alternative embodiment, each of the windows, buttons or icons can be controlled via touch screen technology, which can detect the presence and location of a touch within the display area to change the paper size, change the layout of the image, and to initiate and/or start the printing process.

Figure 10:
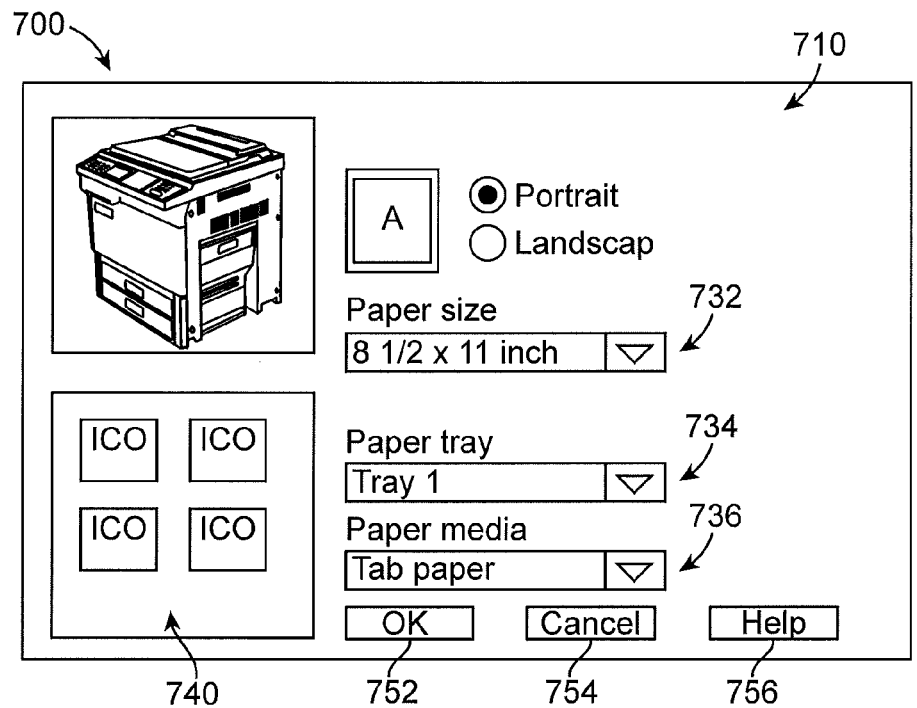
FIG. 10 is an illustration of the FIG. 7 is an illustration of a printer driver user interface of a client device in accordance with an exemplary embodiment.

FIG. 10 is an illustration of a printer driver user interface 700 of a client device in accordance with another exemplary embodiment in which tab sheets are not available within the image forming apparatus. As shown in FIG. 10, upon selection of the paper tray 734 and/or print media 736 of "Tray 1" and/or "Tab paper", respectively, the printer driver user interface generates a tab paper user interface screen 900 as shown in FIG. 11.

Figure 11:
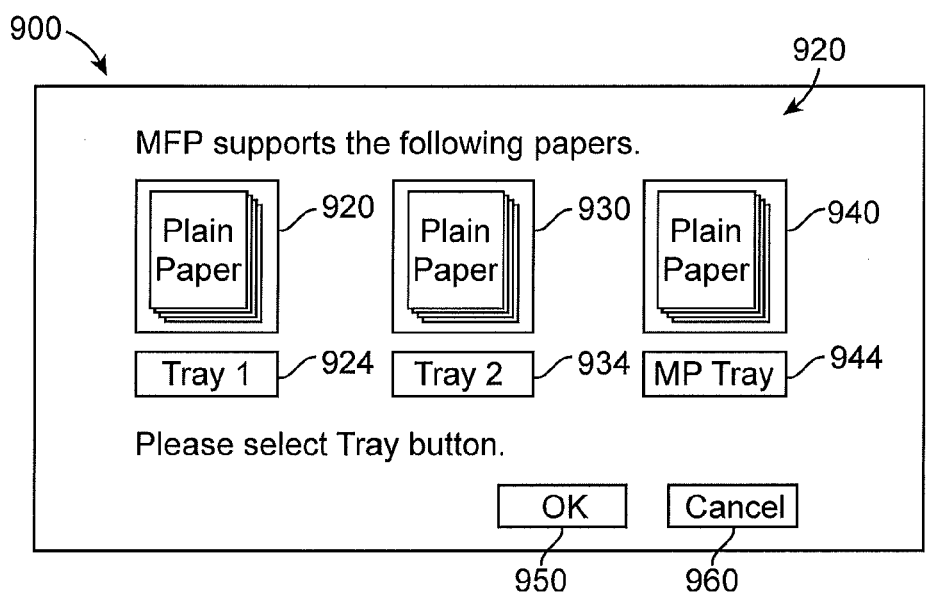
FIG. 11 is an illustration of the printer driver user interface of the client device showing the image forming apparatus which does not support one or more types of tab sheets.

As shown in FIG. 11, the tab paper user interface screen 900 shows the availability of one or more types of tab sheets upon selection of the tab paper 830 icon in the paper media window 800. The tab paper user interface screen 900 is a graphical user interface screen 910, which depicts the one or more trays available and the types of print media available. For example, as shown in FIG. 11, "Tray 1" 920, "Tray 2" 930, and the multi-purpose (MP) tray 940 includes only plain paper 942. In addition, each of the trays 920, 930, 940, includes a selection button or icon 924, 934, 944.

In accordance with an exemplary embodiment, the tab paper user interface screen 900 depicts the available tab sheet by a thumbnail image of the type of print media. The tab paper user interface screen also provides the user with one or more icons or buttons to select a tray having tab sheets with an "OK" button or icon 950, and a "Cancel" button or icon 960. If the image forming apparatus 200 does not include tab sheets of print media, upon selection of tab paper in the paper media, the only button or icon the user can select will be the "Cancel" button or icon 960.

In accordance with another exemplary embodiment, a computer program product comprising a non-transitory computer readable medium having a computer readable code embodied therein for displaying one or more sets of tab sheets on a graphical user interface, the computer readable program code configured to execute a process, which includes the steps of: inputting attributes of one or more sets of tab sheets into an image forming apparatus; converting the attributes of the one or more sets of tab sheets into a thumbnail image; selecting tab paper in a paper media menu on a graphical user interface; displaying the thumbnail image of the one or more sets of tab sheets upon the selection of the tab paper setting; selecting a tray having a set of tab sheets for insertion into a print job; and sending the print job to the image forming apparatus for printing.

The non-transitory computer usable medium may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

The method and system for on-line decision making support as described herein may be implemented using hardware, software or a combination thereof. In addition the method and system for displaying one or more sets of tabs on a printer driver user interface as a thumbnail image of the one or more sets of tabs sheets which are contained within a tray of an image forming apparatus, as disclosed herein may be implemented in one or more computer systems or other processing systems, or partially performed in processing systems such as personal digit assistants (PDAs). In yet another embodiment, the method and system as disclosed is implemented using a combination of both hardware and software.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer program product comprising a non-transitory computer readable medium having a computer readable code embodied therein for displaying two or more sets of tab sheets on a graphical user interface, the computer readable program code configured to execute a process, which includes the steps of:
   inputting attributes of two or more sets of print media having tab sheets into an image forming apparatus;
   converting the attributes of each of the two or more sets of print media having tab sheets into a thumbnail image;
   selecting tab paper in a paper media menu on a graphical user interface;
   displaying the thumbnail image for each of the two or more sets of print media having tab sheets upon the selection of the tab paper in the paper media menu, and wherein the thumbnail image depicts a shape of a tab for each of the two or more sets of print media having tab sheets;
   selecting a tray having a print media having tab sheets for insertion into a print job; and
   sending the print job to the image forming apparatus for printing.

2. The computer program product of claim 1, further comprising:
   printing the print job on the image forming apparatus; and
   inserting the set of tab sheets into the printed print job.

3. The computer program product of claim 1, wherein the step of inputting the attributes of two or more sets of print media having tab sheets into an image forming apparatus comprises:
   selecting a tab paper setting in an operation panel of the image forming apparatus;
   scanning each sheet of the set of tab sheets on the image forming apparatus to form print tab images;
   storing each of the print tab images on the image forming apparatus;
   detecting attributes of the print tab images;
   storing the attributes of the print tab images on the image forming apparatus;
   generating the thumbnail image for the set of tab sheets;

storing the thumbnail image on the image forming apparatus; and selecting a tray from two or more trays of the image forming apparatus and associating the tray of the image forming apparatus with the thumbnail image of the set of tab sheets.

4. The computer program product of claim 1, wherein the step of inputting the attributes of two or more sets of print media having tab sheets into the image forming apparatus comprises:

inputting the attributes of the print tab images into the image forming apparatus manually;

storing the attributes of the print tab images on the image forming apparatus;

generating the thumbnail image of the set of tab sheets;

storing the thumbnail image on the image forming apparatus; and selecting a tray from two or more trays of the image forming apparatus and associating the tray of the image forming apparatus with the thumbnail image of the set of tab sheets.

5. The computer program product of claim 1, wherein the graphical user interface is a printer driver user interface on a client device, the printer user interface providing one or more of the following options to a user:

identifying one or more image forming devices available to the client device;

selecting portrait or landscape, paper size, paper tray, and/or paper media for the print media for the print job; and sending the print job from the client device to the image forming apparatus for printing.

6. The computer program product of claim 1, wherein each of the thumbnail images of the set of print media having tab sheets further depicts a number of tabs for each set of tab sheets.

7. The computer program product of claim 1, wherein the step of inputting the attributes of two or more sets of print media having tab sheets into the image forming apparatus includes two or more of the following attributes of the set of tab sheets:

a size of the print media, a weight of the print media, a color of the print media, and/or a finish on the print media.

8. A method for displaying two or more sets of tab sheets on a graphical user interface, comprising:

inputting attributes of two or more sets of print media having tab sheets into an image forming apparatus;

converting the attributes of each of the two or more sets of print media having tab sheets into a thumbnail image;

selecting tab paper in a paper media menu on a graphical user interface;

displaying the thumbnail image for each of the two or more sets of print media having tab sheets upon the selection of the tab paper in the paper media menu, and wherein the thumbnail image depicts a shape of a tab for each of the two or more sets of print media having tab sheets;

selecting a tray having a print media having tab sheets for insertion into a print job; and sending the print job to the image forming apparatus for printing.

9. The method of claim 8, comprising:

printing the print job on the image forming apparatus; and inserting the set of tab sheets into the printed print job.

10. The method of claim 8, wherein the step of inputting the attributes of the two or more sets of print media having tab sheets into the image forming apparatus comprises:

inputting the attributes of the print tab images into the image forming apparatus manually;

storing the attributes of the print tab images on the image forming apparatus;

generating the thumbnail image for the set of tab sheets;

storing the thumbnail image on the image forming apparatus; and selecting a tray from two or more trays of the image forming apparatus and associating the tray of the image forming apparatus with the thumbnail image of the set of tab sheets.

11. The method of claim 8, wherein the graphical user interface is a printer driver user interface of a client device, the printer driver user interface providing one or more of the following options to a user:

identifying one or more image forming devices available to the client device;

selecting portrait or landscape, paper size, paper tray, and/or paper media for the print media for the print job.

12. The method of claim 8, wherein each of the thumbnail images of the two or more sets of print media having tab sheets depicts a number of tabs for each set of tab sheets, a size of the print media, and a size of each of the tabs.

13. A method for displaying one or more sets of tab sheets on a graphical user interface, comprising:

inputting attributes of one or more sets of print media having tab sheets into an image forming apparatus, wherein the step of inputting the attributes of one or more sets of print media having tab sheets into the image forming apparatus comprises:

selecting a tab paper setting in an operation panel on the image forming apparatus;

scanning each sheet of the set of tab sheets on the image forming apparatus to form print tab images;

storing each of the print tab images on the image forming apparatus;

detecting attributes of the print tab images;

storing the attributes of the print tab images on the image forming apparatus;

generating the thumbnail image for the set of tab sheets;

storing the thumbnail image on the image forming apparatus; and selecting a tray from one or more trays of the image forming apparatus and associating the tray of the image forming apparatus with the thumbnail image of the set of tab sheets;

converting the attributes of each of the one or more sets of print media having tab sheets into a thumbnail image;

selecting tab paper in a paper media menu on a graphical user interface;

displaying the thumbnail image for each of the one or more sets of print media having tab sheets upon the selection of the tab paper in the paper media menu, and wherein the thumbnail image depicts a shape of a tab for each of the one or more sets of print media having tab sheets;

selecting a tray having a print media having tab sheets for insertion into a print job; and sending the print job to the image forming apparatus for printing.

14. An image forming system comprising:

a client device having a printer driver user interface; and an image forming apparatus connected to the client device through a network connection, and wherein the client device and the image forming apparatus perform the following steps:

inputting attributes of one or more sets of print media having tab sheets into an image forming apparatus, wherein the step of inputting the attributes of one or more sets of print media having tabs into the image forming apparatus comprises:
- selecting a tab paper setting in an operation panel on the image forming apparatus;
- scanning each sheet of the set of tab sheets on the image forming apparatus to form print tab images;
- storing each of the print tab images on the image forming apparatus;
- detecting attributes of the print tab images;
- storing the attributes of the print tab images on the image forming apparatus;
- generating the thumbnail image of the set of tab sheets;
- storing the thumbnail image on the image forming apparatus; and
- selecting a tray from one or more trays of the image forming apparatus and associating the tray of the image forming apparatus with the thumbnail image of the set of tab sheets;

converting the attributes of each of the one or more sets of print media having tab sheets into a thumbnail image;
selecting tab paper in a paper media menu on a graphical user interface;
displaying the thumbnail image for each of the one or more sets of print media having tab sheets upon the selection of the tab paper in the paper media menu, and wherein the thumbnail image depicts a shape of a tab for each of the one or more sets of print media having tab sheets;
selecting a tray having a print media having tab sheets for insertion into a print job; and
sending the print job from the client device to the image forming apparatus.

15. The image forming system of claim 14, comprising:
printing the print job on the image forming apparatus; and
inserting the set of tab sheets into the printed print job.

16. The image forming system of claim 14, wherein the step of inputting the attributes of the one or more sets of print media having tab sheets into the image forming apparatus comprises:
- inputting the attributes of the print tab images into the image forming apparatus manually;
- storing the attributes of the print tab images on the image forming apparatus;
- generating the thumbnail image of the set of tab sheets;
- storing the thumbnail image on the image forming apparatus; and
- selecting a tray from one or more trays of the image forming apparatus and associating the tray of the image forming apparatus with the thumbnail image of the set of tab sheets.

17. The image forming system of claim 14, wherein the printer driver for the client device has a printer user interface, the printer user interface providing one or more of the following options to a user:
- identifying one or more image forming devices available to the client device;
- selecting portrait or landscape, paper size, paper tray, and/or paper media for the print media for the print job; and
- wherein each of the thumbnail image of the set of print media having tabs depicts a number of tabs for each set of tab sheets.

18. The image forming system of claim 14, wherein the step of inputting the attributes of one or more sets of tab sheets into the image forming apparatus includes one or more of the following attributes of the set of tab sheets:
a size of the print media, a weight of the print media, a color of the print media, and/or a finish on the print media.

* * * * *